United States Patent
Yasuoka et al.

(10) Patent No.: US 6,625,531 B2
(45) Date of Patent: Sep. 23, 2003

(54) INERTIA TORQUE COMPENSATION CONTROL FOR A VEHICLE FITTED WITH AN INFINITELY VARIABLE TRANSMISSION

(75) Inventors: Masayuki Yasuoka, Yokohama (JP); Nobusuke Toukura, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/891,377

(22) Filed: Jun. 27, 2001

(65) Prior Publication Data

US 2002/0019692 A1 Feb. 14, 2002

(30) Foreign Application Priority Data

Jul. 31, 2000 (JP) ........................................ 2000-230515

(51) Int. Cl.$^7$ .......................... B60K 41/12; F16H 37/08; F16H 61/26
(52) U.S. Cl. ............................ 701/51; 701/61; 475/185
(58) Field of Search ............................ 701/51, 61, 67, 701/79, 54, 84; 475/185, 218; 477/39, 46, 111, 159, 37, 107; 474/11, 18

(56) References Cited

U.S. PATENT DOCUMENTS

| | | | | |
|---|---|---|---|---|
| 4,297,918 A | | 11/1981 | Perry ........................... 476/10 |
| 5,288,281 A | * | 2/1994 | Perry ........................... 475/191 |
| 5,667,457 A | * | 9/1997 | Kuriyama et al. ........... 477/156 |
| 5,790,968 A | * | 8/1998 | Kashiwabara et al. ........ 701/51 |
| 5,816,976 A | * | 10/1998 | Kuroiwa et al. ............. 477/102 |
| 5,928,301 A | * | 7/1999 | Soga et al. .................... 701/51 |
| 5,976,054 A | * | 11/1999 | Yasuoka ....................... 477/48 |
| 6,027,425 A | * | 2/2000 | Sakaguchi et al. ............ 477/48 |
| 6,272,414 B1 | * | 8/2001 | Takahashi et al. ............ 701/54 |
| 6,317,672 B1 | * | 11/2001 | Kuramoto et al. ............ 701/51 |
| 6,351,700 B1 | * | 2/2002 | Muramoto et al. ........... 701/51 |
| 6,358,179 B1 | * | 3/2002 | Sakai et al. ................. 475/216 |

FOREIGN PATENT DOCUMENTS

JP  11-20512  1/1999

* cited by examiner

*Primary Examiner*—Tan Q. Nguyen
*Assistant Examiner*—Dalena Tran
(74) *Attorney, Agent, or Firm*—Foley & Lardner

(57) ABSTRACT

An IVT controller determines whether the operation mode of an infinitely variable transmission (IVT) is a power recirculation mode or a CVT direct mode, and selects an inertial torque computing equation corresponding to the operation mode. The inertia torque accompanying a speed change of the IVT is computed using the computing equation. An engine controller adjusts the opening of an electronic control throttle, and adjusts the torque of the engine so that computed inertia torque is eliminated.

3 Claims, 6 Drawing Sheets

INERTIA TORQUE COMPENSATION CONTROL FOR A VEHICLE FITTED WITH AN INFINITELY VARIABLE TRANSMISSION

FIELD OF THE INVENTION

The present invention relates to a vehicle provided with an infinitely variable transmission which can make a speed ratio infinite, wherein a variation of inertia torque during a speed change is compensated to improve drivability.

BACKGROUND OF THE INVENTION

A continuously variable transmission (CVT) is controlled so that a speed ratio (value obtained by dividing a transmission input rotation speed by a transmission output rotation speed) is a target speed ratio determined from the throttle opening of an engine, and the vehicle speed.

If the speed ratio changes with speed change, the rotation speed of the engine will change and an inertia torque will arise. This inertia torque affects drivability during the speed change. For example, since the engine torque decreases due to a negative inertia torque when a downshift which increases engine speed is performed, the driver has the feeling that torque is insufficient. Conversely, as the engine torque increases due to a positive inertia torque when an upshift which reduces the engine speed is performed, the driver has the feeling that the torque is excessive.

JP-A-H11-20512 published by the Japanese Patent Office in 1999 discloses a technique of suppressing the variation of engine torque due to the inertia torque during a speed change, by adjusting the engine torque according to the inertia torque during the speed change. According to this technique, the inertia torque during speed change is calculated from the variation rate of the speed ratio and the output rotation speed of the transmission, and the engine torque is adjusted so that the inertia torque may be eliminated.

SUMMARY OF THE INVENTION

Further, in an infinitely variable transmission (IVT) which realizes an infinite speed ratio by combining a continuously variable transmission with a planetary gear set, the above-mentioned inertia torque compensation is necessary.

However, in the IVT, the power transfer route inside the transmission changes over in a power recirculation mode used when the vehicle is stationary or when it is moving at low speed, and in a CVT direct mode used when the vehicle is moving forward at high speed. Accordingly, the moment of inertia of the power train is different in these two modes, so the above-mentioned prior art technique is inapplicable as it is.

It is therefore an object of this invention to improve drivability during a speed change by calculating the inertia torque at the time of speed change with high accuracy, and compensating the inertia torque in a vehicle provided with an IVT.

In order to achieve above object, this invention provides a vehicle control system, comprising an engine, an infinitely variable transmission connected to the engine, the transmission comprising a continuously variable speed change mechanism, a planetary gear set, and an operation mode change-over mechanism which changes over between a power recirculation mode wherein power is transmitted through the speed change mechanism and planetary gear set, and a CVT direct mode wherein power is transmitted only through the speed change mechanism, a drive shaft to which the torque of the engine is transmitted via the transmission, and a microprocessor. The microprocessor is programmed to determine whether the operation mode of the transmission is the power recirculation mode or the CVT direct mode, select an inertia torque computing equation corresponding to the operation mode of the transmission, compute the inertia torque accompanying a speed change of the transmission using the selected inertia torque computing equation, and adjust the torque of the engine so that the computed inertia torque is compensated.

The details as well as other features and advantages of this invention are set forth in the remainder of the specification and are shown in the accompanying drawings.

DESCRIPTION OF THE PREFERRED EMBODIMENTS

Figure 1:
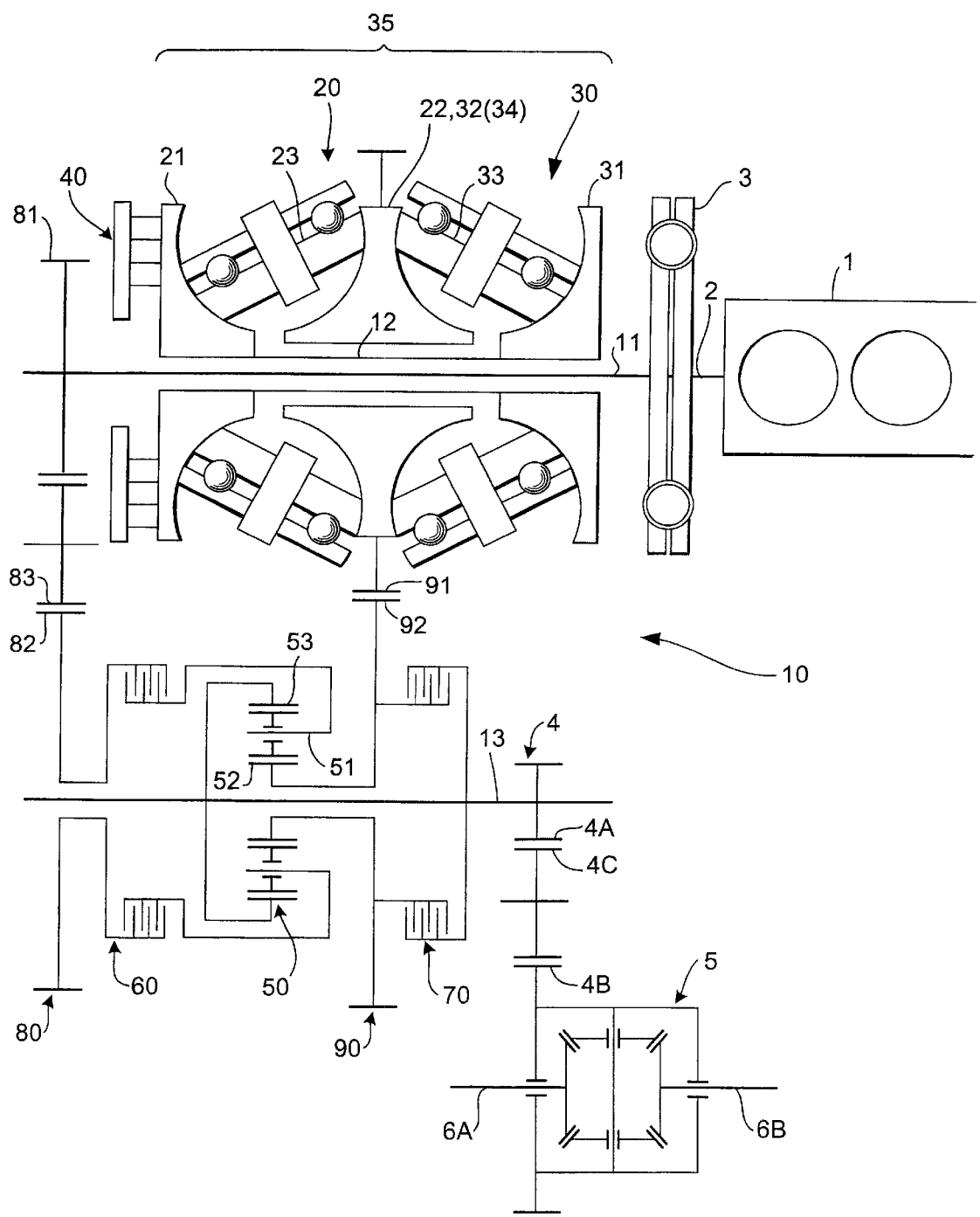
FIG. 1 is a schematic diagram of an infinitely variable transmission (IVT).

Referring to FIG. 1 of the drawings, an infintely variable transmission (IVT) 10 comprises an input shaft 11 connected to an output shaft 2 of an engine 1 via a torsional damper 3, a hollow primary shaft 12 disposed in a space outside the shaft 11, and a secondary shaft 13 arranged parallel to these shafts 11, 12.

A toroidal continuously variable speed change mechanism (CVT) 35 and loading cams 40 are installed outside the input shaft 11 and the primary shaft 12.

A power recirculation mode clutch 60 and a CVT direct mode clutch 70 are installed outside the secondary shaft 13. A first gear train 80 and a second gear train 90 are interposed between the shafts 11,12 and secondary shaft 13.

The CVT 35 comprises a first speed change mechanism 20 and a second speed change mechanism 30. The speed change mechanisms 20, 30 have essentially the same construction. The speed change mechanisms 20, 30 comprise input disks 21, 31 and output disks 22, 32 which have a toroidal surface. Power rollers 23, 33 which transmit power to the output disks 22, 32 from the input disks 21, 31 are disposed between the input disks 21, 31 and the output disks 22, 32.

In the first speed change mechanism 20 which is further from the engine 1, the input disk 21 is disposed on the side further from the engine 1, and the output disk 22 is disposed on the side nearer the engine 1. In the second speed change mechanism 30 which is nearer the engine 1, the input disk 31 is disposed on the side nearer the engine 1 and the output disk 32 is disposed on the side further from the engine 1. The input disks 21, 31 of the speed change mechanisms 20, 30 are combined with the left and right ends of the primary shaft 12, respectively.

The output disks 22, 32 are joined together, and supported free to rotate in the middle of the primary shaft 12. Hereafter, the output disks 22, 32 will be referred to as a one-piece output disk 34.

A first gear 81 of the first gear train 80 is joined to the end of the input shaft 11 more distant from the engine 1. The loading cam 40 is interposed between the first gear 81 and the input disk 21 of the first speed change mechanism 20. A first gear 91 of the second gear train 90 is formed on the outer circumference of the one-piece output disk 34.

A second gear 82 of the first gear train 80 is supported free to rotate at the end of the secondary shaft 13 further from the engine 1. The second gear 82 engages with the first gear 81 via the idler gear 83. A planetary gear set 50 is disposed in the middle of the secondary shaft 13.

The power recirculation mode clutch 60 is interposed between a pinion carrier 51 of the planetary gear set 50, and the second gear 82 of the first gear train 80. The pinion carrier 51 is engaged with or released from the second gear 82 by the power recirculation mode clutch 60. A second gear 92 of the second gear train 90, which engages with the first gear 91, is supported free to rotate on the side of the planetary gear set 50 nearer the engine 1. The second gear 92 and the sun gear 52 of the planetary gear set 50 are connected. The ring gear 53 of the planetary gear set 50 is joined to the secondary shaft 13.

The CVT direct mode clutch 70 which engages or releases the second gear 92 of the second gear train 90 and the secondary shaft 13 is supported on the side of the planetary gear set 50 nearer the engine 1.

Figure 2:
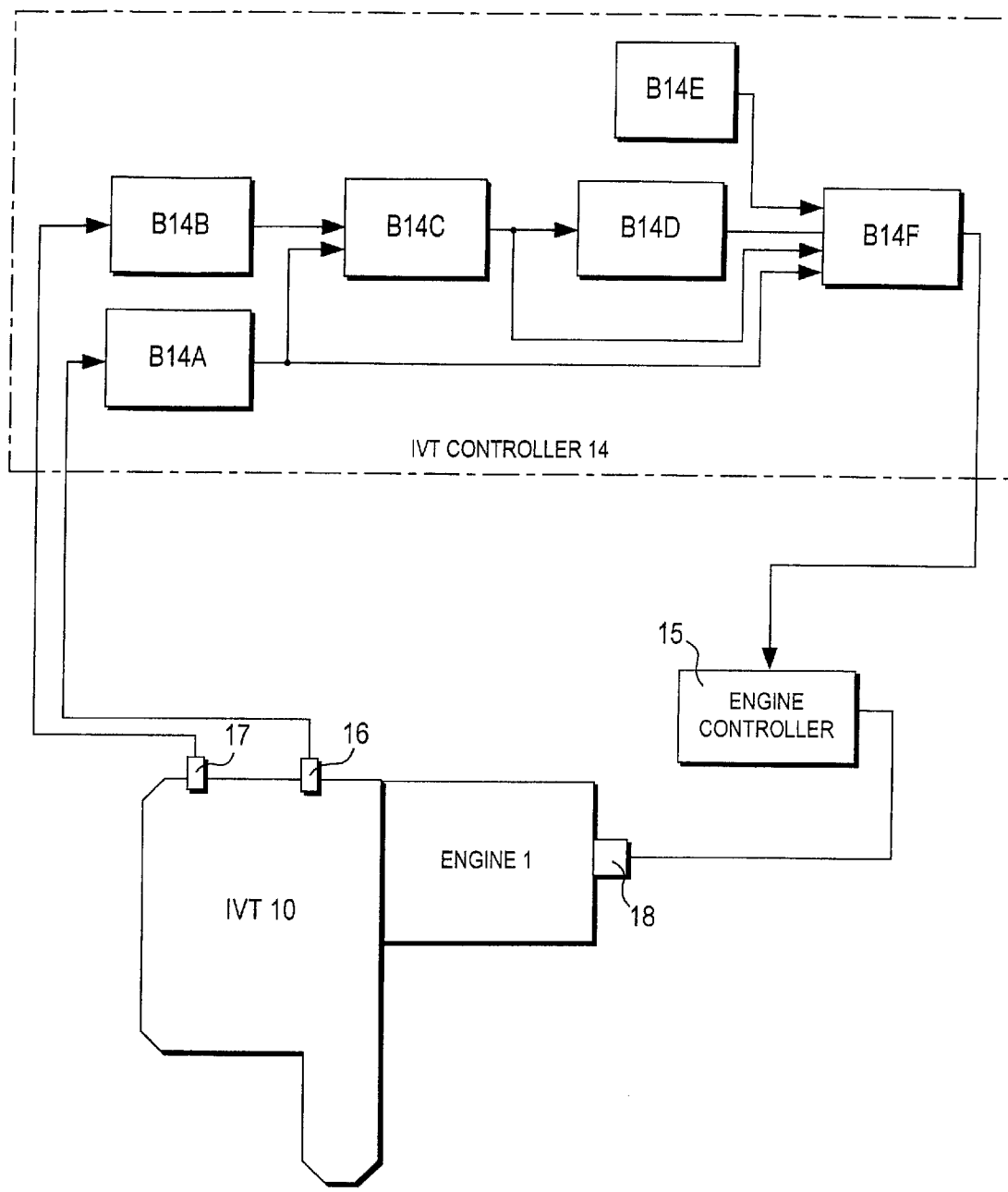
FIG. 2 is a control block diagram of an inertia torque compensation control device relating to this invention.

A differential gear unit 5 is connected with the end of the secondary shaft 13 nearer the engine 1 via a third gear train 4 comprising first and second gears 4A, 4B and an idle gear 4C. Drive force is transmitted to the left and right drive wheels, not shown, via the differential gear unit 5 and drive shafts 6A, 6B, FIG. 2 is a control block diagram of the inertia torque compensation control device.

The inertia torque compensation control device is provided with an IVT controller 14 and an engine controller 15.

The IVT controller 14 comprises a block B14A to a block B14F.

The block B14A calculates the input rotation speed of the CVT 35 based on a signal from a CVT input rotation speed sensor 16 which detects the rotation speed of the input disks 21, 31, or the rotation speed of the input shaft 11.

The block B14B calculates the output rotation speed of the CVT 35 based on a signal from a CVT output rotation speed sensor 17 which detects the rotation speed of the output disks 22, 32.

The block B14C divides the CVT output rotation speed by the CVT input rotation speed, and calculates the inverse of the speed ratio of the CVT 35.

The block B14D calculates the variation rate of the inverse of the CVT speed ratio based on the inverse of the CVT speed ratio.

The block B14E determines whether the operation mode of the IVT 10 is the power recirculation mode or CVT direct mode, or whether the IVT 10 is undergoing a change-over of the operation mode.

The block B14F selects the inertia torque computing equation corresponding to the operation mode. The inertia torque accompanying speed change is then computed using the selected inertia torque computing equation, based on the CVT input rotation speed, the inverse of the CVT speed ratio, and the variation rate of the inverse of the CVT speed ratio. The inertia compensation torque is calculated based on the inertia torque. When it is determined that the IVT 10 is undergoing an operation mode change-over, the inertia compensation torque is set to zero. The calculated inertia compensation torque is output to the engine controller 15.

The engine controller 15 adjusts the throttle opening of the electronic control throttle 18 according to the inertia compensation torque calculated by the block B14F, adjusts the engine torque, and eliminates the inertia torque.

Figure 3:
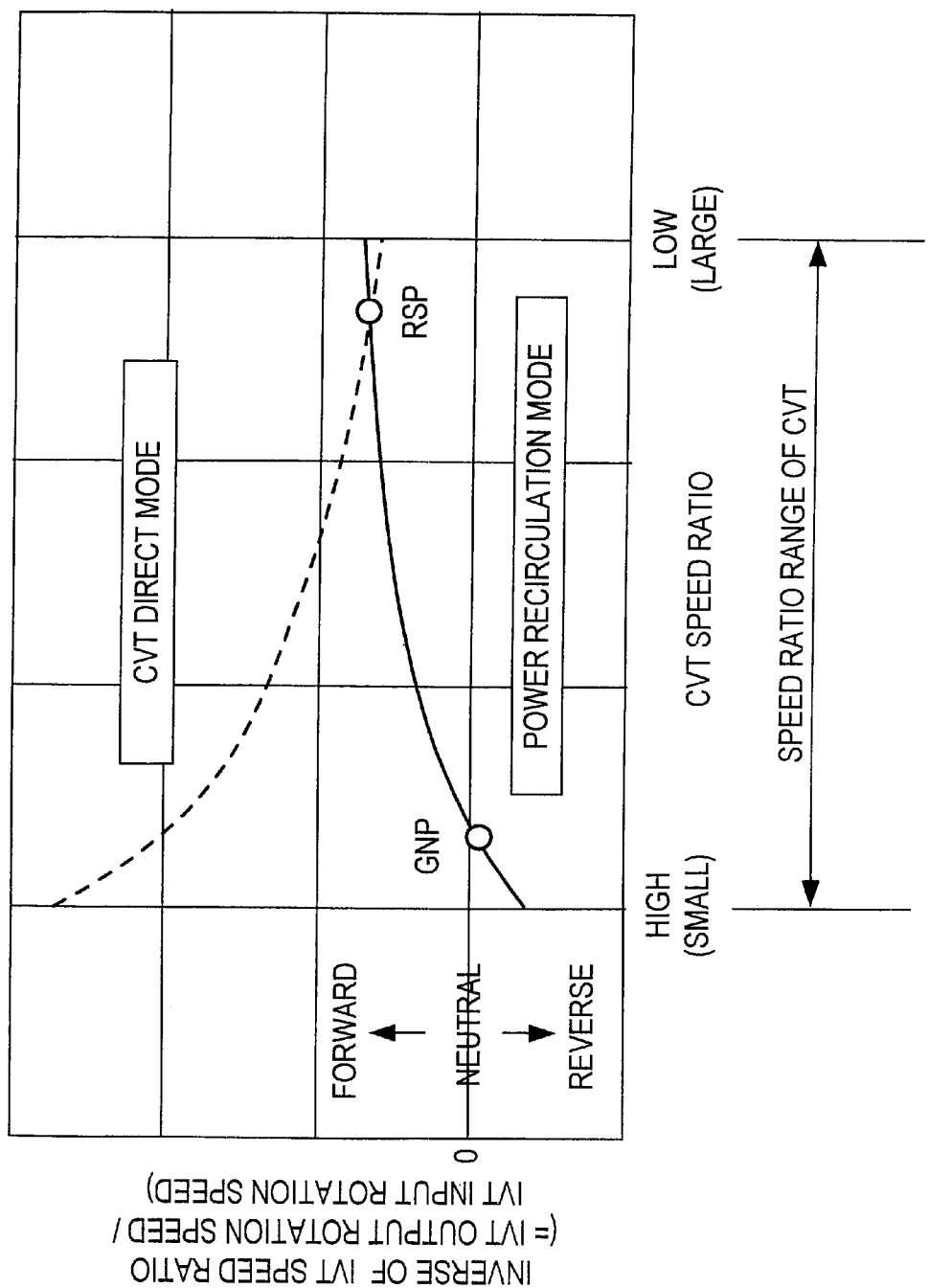
FIG. 3 is a diagram showing the speed ratio characteristic of an IVT.

Next, the IVT speed ratio characteristic shown in FIG. 3 will be described. The vertical axis is the inverse of the speed ratio of IVT 10, and the horizontal axis is the speed ratio of the CVT 35. The speed ratio of the IVT 10 is a value obtained by dividing the rotation speed of the input shaft 11 (=IVT input rotation speed) by the rotation speed of the secondary shaft 13 (=IVT output rotation speed).

The IVT controller 14 performs change-over control of the operation mode of IVT 10 in addition to the above-mentioned inertia torque compensation control. If the power recirculation mode clutch 60 is engaged and the CVT direct mode clutch 70 is released, the power recirculation mode obtains in which power is transmitted in the speed ratio range including the geared neutral point GNP where the IVT speed ratio becomes infinite.

If the power recirculation mode clutch 60 is released and the CVT direct mode clutch 70 is engaged, the CVT direct mode obtained in which power is transmitted according to the output of the speed change mechanisms 20, 30. The change-over of the two modes is performed at the revolution synchronization point (RSP) where the IVT speed ratio in the power recirculation mode and the IVT speed ratio in the CVT direct mode coincide.

Further, the IVT controller 14 divides the target 1VT input rotation speed set based on the vehicle speed and throttle opening, by the rotation speed of the secondary shaft 13 detected by the IVT output rotation speed sensor, not shown, calculates a target 1VT speed ratio, and controls the speed ratio of the CVT 35 so that the IVT speed ratio is the target 1VT speed ratio.

In the power recirculation mode, the power recirculation mode clutch 60 is engaged, so the pinion carrier 51 of the planetary gear set 50 rotates at a rotation speed lower than the IVT input rotation speed due to the first gear train 80. The sun gear 52 changes its rotation speed according to the CVT speed ratio. The rotation speed of the ring gear 53 is the output rotation speed of IVT 10. Therefore, in the power recirculation mode, as shown in FIG. 3, the direction of output rotation of the IVT 10 changes from reverse to the neutral state and then to the forward direction as the CVT speed ratio changes from high (small) to low (large).

In the CVT direct mode, as the power recirculation mode clutch 60 is released, the pinion carrier 51 of the planetary gear set 50 rotates freely. Moreover, as the CVT direct mode clutch 70 is engaged, the ring gear 53 is joined to the sun gear 52 and rotates with the same rotation speed as the sun gear 52. Therefore, in the CVT direct mode, as shown in FIG. 3, the IVT speed ratio changes from low (large) to high (small) in the forward direction as the CVT speed ratio changes from low (large) to high (small).

Figure 4:
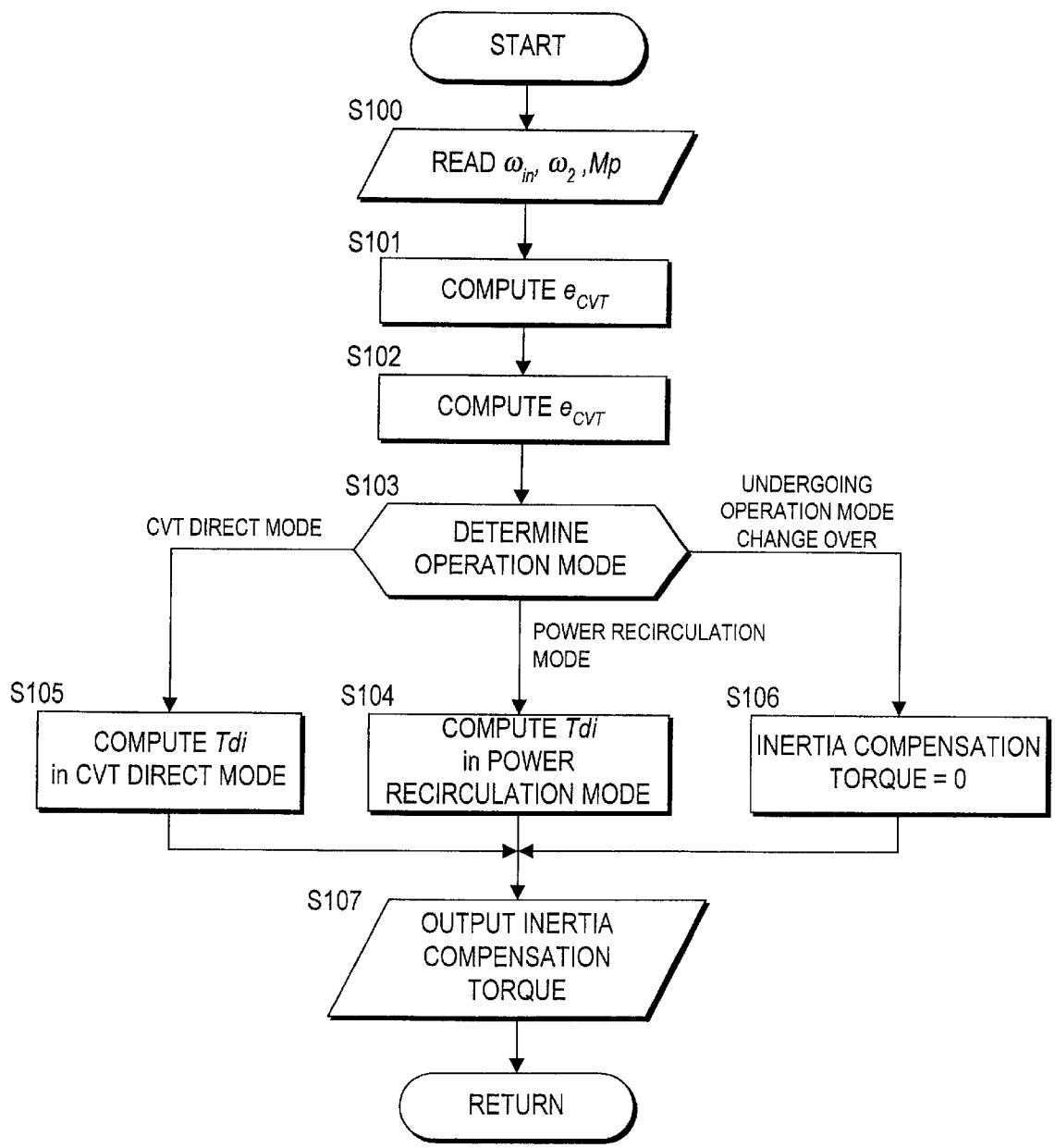
FIG. 4 is a flowchart showing the details of the inertia torque compensation control.

FIG. 4 shows a flowchart which shows the process of the inertia torque compensation control performed by the IVT controller 14.

In a step S100, the input rotation speed $\omega i_n$ of the CVT 35, an output rotation speed $\omega_2$ and an operation mode Mp of the IVT 10 are read.

In a step S101, the inverse $e_{CVT}$ of the CVT speed ratio is computed by the following equation:

$$e_{CVT}=\omega_2/\omega_{in}$$

In a step S102, the variation rate $e_{CVT}'$ of the inverse of the CVT speed ratio is computed by the following equation:

$$e_{CVT}'=(e_{CVT}-e_{CVT}z)/dT$$

where $e_{CVT}z$=inverse of the CVT speed ratio in the immediately preceding computation, and dT=computing period.

In a step S103, the present operating mode of the IVT 10 is determined. When the operation mode is the power recirculation mode, the routine proceeds to a step S104, when it is the CVT direct mode, it proceeds to a step S105, and when the operation mode is changing over, it proceeds to a step S106.

In the step S104, the inertia torque computing equation for the power recirculation mode is selected, and the inertia torque Tdi is computed using this. The inertia torque computing equation for the power recirculation mode is described later.

In the step S105, the inertia torque computing equation for the CVT direct mode is selected, and the inertia torque Tdi is calculated using this. The inertia torque computing equation for the CVT direct mode is calculated later.

In the step S106, as the operation mode is changing over, the inertia torque is set to zero so that the inertia compensation torque becomes zero and the inertia torque compensation control does not disturb control of the operation mode change-over.

In a step S107, an inertia compensation torque having an opposite sign to the inertia torque computed by any of the steps S104 to S106 is output to the engine control controller 15.

Figure 5:
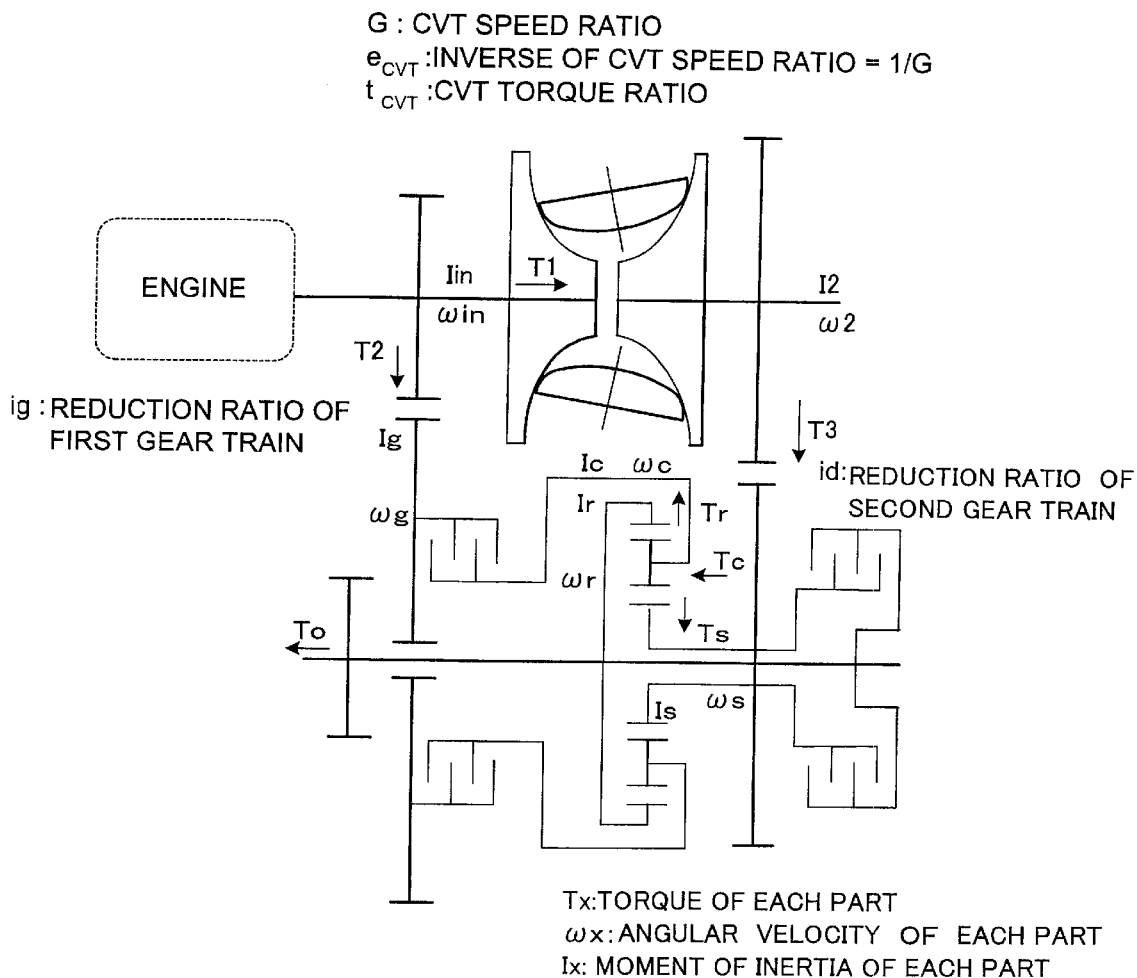
FIG. 5 is a model of a power train of a vehicle fitted with the IVT used for describing an equation for computing the inertia torque.

Next, the computing equation of the inertia torque for the power recirculation mode will be described, referring to FIG. 5. FIG. 5 shows a model for calculating the inertia torque.

In the power recirculation mode, as the power recirculation mode clutch 60 is engaged and the direct mode clutch 70 is released, the equations of motion of each part are as follows.

$$T_{in}=I_{in}\cdot\omega'_{in}+T_1+T_2 \quad (1)$$

$$t_{CVT}\cdot T_1=I_2\cdot\omega'_2+T_3 \quad (2)$$

$$i_g\cdot T_2=I_g\cdot\omega'_g+I_c\cdot\omega'_c+T_c \quad (3)$$

$$i_d\cdot T_3=I_s\cdot\omega'_s-T_s \quad (4)$$

$$T_r=I_r\cdot\omega'_r+T_o \quad (5)$$

$T_X$ is the torque of each part, $\omega_X$ is the angular velocity of each part, $I_X$ is moment of inertia of each part, $i_g$ is the reduction ratio of the first gear train 80, $i_d$ is the reduction ratio of the second gear train 90, and $t_{CVT}$ is the torque ratio of the CVT 35.

Also, from the characteristics of the planet gears, $$T_c=T_r+T_s \quad (6)$$

$$\omega_c=\{1/(1+\alpha)\}\cdot(\omega_r+\alpha\cdot\omega_s) \quad (7)$$

$\alpha$ is the gear ratio of the sun gear to the ring gear.

Here, $$\omega_s=\omega_{in}/(G\cdot i_d) \quad (8)$$

G is the CVT speed ratio. Therefore, if $e_{CVT}$ is 1/G, $$\omega'_s = d/dt(\omega_{in}/(G\cdot i_d)) \quad (9)$$
$$= (1/i_d)\cdot(e_{CVT}\cdot\omega'_{in} + e'_{CVT}\cdot\omega_{in})$$

Similarly, $$\omega'_2 = d/dt(\omega_{in}/G) \quad (10)$$
$$= e_{CVT}\cdot\omega'_{in} + e'_{CVT}\cdot\omega_{in}$$

From equations (4) and (9), $$T_3=(1/i_d)\cdot\{(I_s/i_d)\cdot(e_{CVT}\cdot\omega'_{in}+e'_{CVT}\cdot\omega_{in})\}-T_s \quad (11)$$

From equations (2), (10) and (11), $$T_1=\{I_2/(G\cdot t_{CVT})+I_s/(G\cdot t_{CVT}\cdot i_d^2)\}\cdot\omega'_{in}+\{I_2/t_{CVT}+I_s/(t_{CVT}\cdot i_d^2)\}\cdot e'_{CVT}\cdot\omega_{in}-T_s/(t_{CVT}\cdot i_d) \quad (12)$$

Next, $$\omega_s=\omega_2/i_d=(e_{CVT}\cdot\omega_{in})/i_d \quad (13)$$

and in the power recirculation mode, $$\omega_c=\omega_g=\omega_{in}/i_g \quad (14)$$

Hence, from equations (7), (13) and (14), $$\omega'_r = (1+\alpha)\cdot\omega'_c - \alpha\cdot\omega'_s \quad (15)$$
$$= \{(1+\alpha)/i_g - (\alpha/i_d)\cdot e_{CVT}\}\cdot\omega'_{in} - (\alpha/i_d)\cdot e'_{CVT}\cdot\omega_{in}$$

Therefore, from equations (3), (14), (6), (5) and (16), $$T_2 = \{(I_g+I_c)/i_g^2\}\cdot\omega'_{in} + T_c/i_g \quad (16)$$
$$= \{(I_g+I_c)/i_g^2\}\cdot\omega'_{in} + (I_r/I_g)\cdot\omega'_r + (T_o+T_s)/I_g$$
$$= [\{I_g+I_c+(1+\alpha)\cdot I_r\}/i_g^2 - (\alpha\cdot I_r\cdot e_{CVT})/(i_g\cdot i_d)]\cdot\omega'_{in} - \{(\alpha\cdot I_r)/(i_g\cdot i_d)\}\cdot e'_{CVT}\cdot\omega_{in} + (T_o+T_s)/i_g$$

Here, setting $$A=I_2/(G\cdot t_{CVT})+I_s/(G\cdot t_{CVT}\cdot i_d^2)$$

$$B=I_2/t_{CVT}+I_s/(t_{CVT}\cdot i_d^2)$$

$$C=\{I_g+I_c+(1+\alpha)\cdot I_r\}/i_g^2-(\alpha\cdot I_r\cdot e_{CVT})/(i_g\cdot i_d)$$

$$D=(\alpha\cdot I_r)/(i_g\cdot i_d),$$

from equations (1), (12) and (16), $$T_{in}=(I_{in}+A+C)\cdot\omega'_{in}+(B+D)\cdot e'_{CVT}\cdot\omega_{in}+\{1/i_g-1/(t_{CVT}\cdot i_d)\}\cdot T_s+T_o/i_g \quad (17)$$

The second term of the right-hand side of equation (17) is a torque directly proportional to the differential of the inverse of the CVT speed ratio (variation rate of the inverse of the CVT speed ratio), i.e., the inertia torque accompanying a speed change of the IVT 10 which acts on the IVT input shaft. Therefore, the inertia torque computing equation for the power recirculation mode is:

$$Tdi=(B+D)\cdot e'_{CVT}\cdot\omega_{in} \quad (18)$$

The torque ratio $t_{CVT}$ of the CVT 35 is calculated for example by the following formula:

$$t_{CVT} = \eta \cdot G$$

Here, $\eta$ is a transmission efficiency, for example 0.95.

Next, the computing equation of the inertia torque for the CVT direct mode will be described. This will be described using the model shown in FIG. 5 as in the case of the power recirculation mode.

In the CVT direct mode, as the power recirculation mode clutch 60 is released and the direct mode clutch 70 is engaged, the equations of motion of each part are the following:

$$T_{in} = I_{in} \cdot \omega'_{in} + T_1 + T_2 \qquad (21)$$

$$i_g \cdot T_2 = I_g \cdot \omega'_g \qquad (22)$$

$$t_{CVT} \cdot T_1 = I_2 \cdot \omega'_2 + T_3 \qquad (23)$$

$$i_d \cdot T_3 = (I_s + I_c + I_r) \cdot \omega'_r + T_o \qquad (24)$$

From equation (22), $$T_2 = (I_g \cdot \omega'_g)/i_g \qquad (25)$$
$$= (I \cdot \omega'_{in})/i_g^2$$

Also, $$\omega'_r = d/dt(\omega_{in}/(G \cdot i_d)) \qquad (26)$$
$$= (1/i_d) \cdot (e_{CVT} \cdot \omega'_{in} + e'_{CVT} \cdot \omega_{in})$$

Hence, from equations (24) and (26), $$T_3 = \{(I_s + I_c + I_r) \cdot (e_{CVT} \cdot \omega'_{in} + e'_{CVT} \cdot \omega_{in}) + T_o\}/i_d^2 \qquad (27)$$

From equations (23) and (27), $$T_1 = I_2 \cdot (e_{CVT} \cdot \omega'_{in} + e'_{CVT} \cdot W_{in})/t_{CVT} + (I_s + I_c + I_r) \cdot (e_{CVT} \cdot \omega'in + e'_{CVT} \cdot \omega_{in})/(t_{CVT} \cdot i_d^2) + T_o/(t_{CVT} \cdot i_d) \qquad (28)$$

Therefore, $$T_{in} = \{I_{in} + I_g/i_g^2 + I_2$$
$$/(t_{CVT} \cdot G) + (I_s + I_c +$$
$$I_r)/(t_{CVT} \cdot G \cdot i_d^2)\} \cdot \omega$$
$$'_{in} + \{(I_2/t_{CVT}) +$$
$$(I_s 30\ I_c + I_r)/(t_{CVT} \cdot i_d^2)\}$$
$$\cdot e'_{CVT} \cdot \omega_{in} + (T_o/(t_{CVT}$$
$$\cdot i_d)) \qquad (29)$$

The second term of the right-hand side of an equation (29) is a torque directly proportional to the differential of the inverse of the CVT speed ratio (=variation rate of the inverse of the CVT speed ratio), i.e., the inertia torque accompanying the speed change of the IVT 10 which acts on the IVT input shaft. Therefore, the inertia torque computing equation for the CVT direct mode is:

$$Tdi = \{(I_2/t_{CVT}) + (I_s + I_c + I_r)/(t_{CVT} \cdot i_d^2)\} \cdot e'_{CVT} \cdot \omega_{in} \qquad (30)$$

The torque ratio $t_{CVT}$ of CVT 35 is calculated as in the case of the power recirculation mode.

As described above, according to this invention, it is determined whether the operation mode of the IVT 10 is the power recirculation mode or the CVT direct mode, and the inertia torque computing equation is changed according to the determination result. The inertia torque accompanying the speed change of the IVT 10 is then calculated using the computing equation corresponding to the operation mode, the opening of the electronic control throttle 18 is adjusted, and the torque of the engine 1 is adjusted so that the computed inertia torque is eliminated.

According to the running conditions, the operation mode of the IVT 10 is changed over to the power recirculation used for reversing, a stop, or low speed forward motion, or the CVT direct mode used for high speed forward motion. The power transfer route inside the transmission changes over according to the selected mode, and the moment of inertia of the power train thereby changes. According to this invention, as the inertia torque is computed using the computing equation corresponding to each mode, the inertia torque can be computed with high precision and the drivability during a speed change can be improved irrespective of the operation mode during the speed change.

Figure 6:
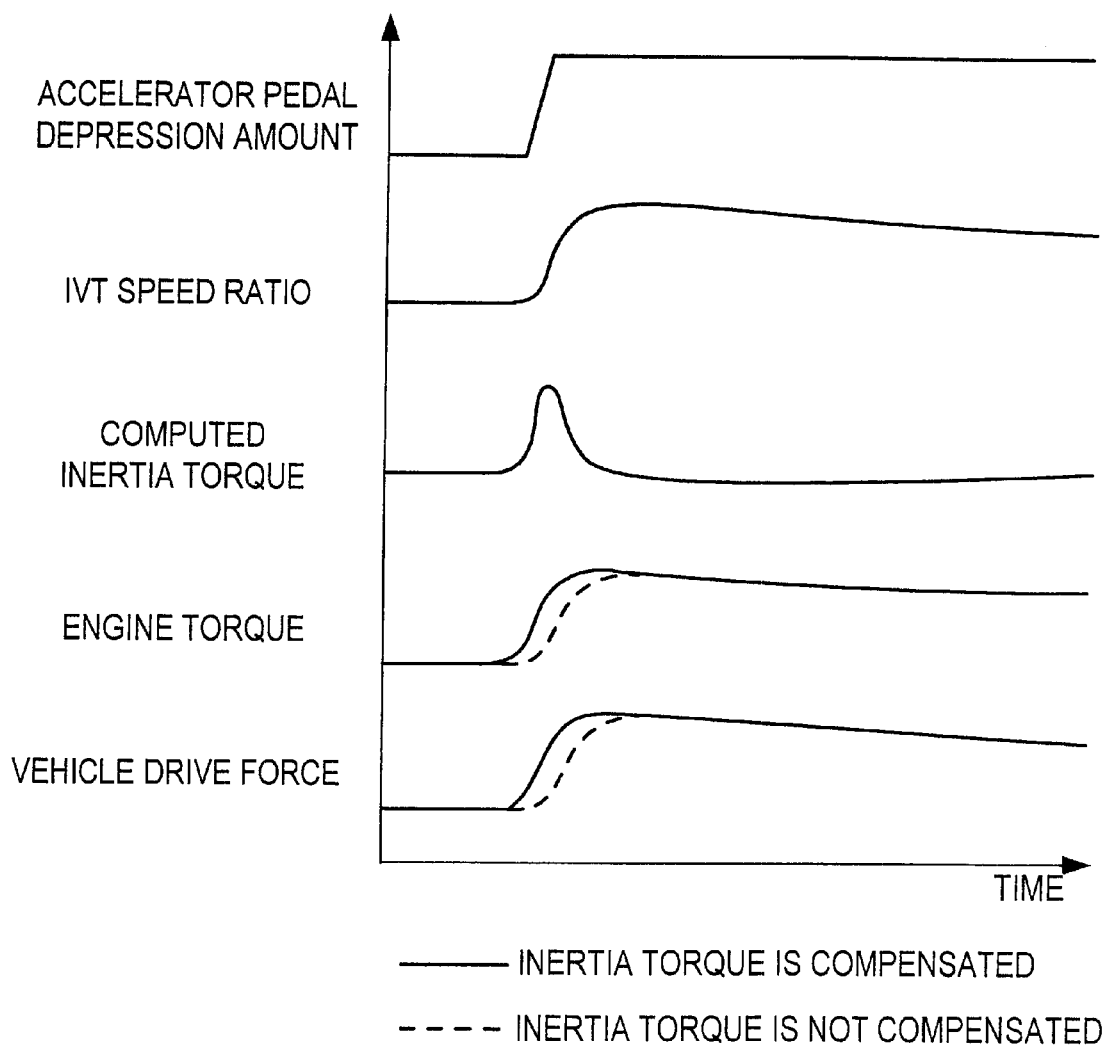
FIG. 6 is a time chart showing how an accelerator pedal depression amount, IVT speed ratio, computed value of the inertia torque, engine torque and vehicle drive force vary when a downshift is performed due to depression of the accelerator pedal.

FIG. 6 shows the situation when a downshift is performed by depressing the accelerator pedal, and the engine torque decreases by the amount of the negative inertia torque. The solid line shows the case where the inertia torque is compensated by this invention, and the broken line shows the case where the inertia torque is not compensated.

When the inertia torque is compensated, the inertia compensation torque is added to the engine torque, so decrease of engine torque is suppressed and a vehicle drive force according to accelerator operation can be obtained.

Moreover, the inertia torque can be calculated with good precision including near zero vehicle speed by calculating the inertia torque based not on the variation rate of the inverse of the IVT speed ratio, but based on the variation rate of the inverse of the CVT speed ratio. This is because, as the CVT 35 is always rotating during engine rotation even if the vehicle is stopping, the CVT output rotation speed can always be detected with good precision. The inertia torque can also be computed based on the variation rate of the inverse of the IVT speed ratio, but in this case the IVT output rotation speed approaches zero near zero vehicle speed, so the detection precision is poorer, the detection precision of the variation rate of the inverse of the IVT speed ratio is poorer, and the precision of computing the inertia torque is poorer.

Moreover, if the inertia torque compensation control is performed during operation mode change-over control, the inertia torque compensation control will cause the engine torque to fluctuate, and the inertia torque compensation control will disturb the operation mode change-over control. However, according to this invention, as the inertia compensation torque is set to zero and the inertia torque compensation control is not performed during an operation mode change-over, the disturbance over the operation mode change-over can be reduced and the precision of the operation mode change-over can be improved.

In the above-mentioned embodiment, the inertia torque is compensated by adjusting the opening of the electronic control throttle, however, the inertia torque may be compensated also by connecting a motor to the engine, and adjusting the torque of this motor.

The entire contents of Japanese Patent Application P2000-230515 (filed Jul. 31, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A vehicle control system, comprising:

an engine, an infinitely variable transmission connected to the engine, the transmission comprising a continuously variable speed change mechanism, a planetary gear set, and an operation mode change-over mechanism which changes over between a power recirculation mode wherein power is transmitted through the speed change mechanism and planetary gear set, and a CVT direct mode wherein power is transmitted only through the speed change mechanism, a drive shaft to which the torque of the engine is transmitted via the transmission, and a microprocessor programmed to:
  determine whether the operation mode of the transmission is the power recirculation mode or the CVT direct mode,
  select an inertia torque computing equation corresponding to the operation mode of the transmission,
  compute the inertia torque accompanying a speed change of the transmission using the selected inertia torque computing equation,
  adjust the torque of the engine so that the computed inertia torque is compensated, and
  interrupt adjustment of the engine torque based on the inertia torque while the transmission is undergoing a change-over of the operation mode.

2. A vehicle control system as defined in claim 1, further comprising:

a sensor which detects the input rotation speed of the speed change mechanism, and a sensor which detects the output rotation speed of the speed change mechanism, and wherein the microprocessor is further programmed to:
  compute the ratio of the input rotation speed and output rotation speed of the speed change mechanism,
  compute the variation rate of the computed ratio, and
  compute the inertia torque using the selected inertia torque computing equation based on the input rotation speed of the speed change mechanism, the computed ratio and the variation rate of the computed ratio.

3. A vehicle control system, comprising:

an engine, an infinitely variable transmission connected to the engine, the transmission comprising a continuously variable speed change mechanism, a planetary gear set, and an operation mode change-over mechanism which changes over between a power recirculation mode wherein power is transmitted through the speed change mechanism and planetary gear set, and a CVT direct mode wherein power is transmitted only through the speed change mechanism, a drive shaft to which the torque of the engine transmitted via the transmission, means for determining whether the operation mode of the transmission is the power recirculation mode or the CVT direct mode, means for selecting an inertia torque computing equation corresponding to the operation mode of the transmission, means for computing the inertia torque accompanying a speed change of the transmission using the selected inertia torque computing equation, means for adjusting the torque of the engine so that the computed inertia torque is compensated, and means for interrupting adjusting of the torque of the engine while the transmission is undergoing a change-over of the operation mode.

* * * * *